US010355561B2

(12) United States Patent
Holzapfel

(10) Patent No.: US 10,355,561 B2
(45) Date of Patent: Jul. 16, 2019

(54) SLIPRING WITH ACTIVE COOLING

(71) Applicant: SCHLEIFRING GMBH, Furstenfeldbruck (DE)

(72) Inventor: Christian Holzapfel, Fürstenfeldbruck (DE)

(73) Assignee: SCHLEIFRING GMBH, Fürstenfeldbruck (DE)

( * ) Notice: Subject to any disclaimer, the term of this patent is extended or adjusted under 35 U.S.C. 154(b) by 136 days.

(21) Appl. No.: 15/275,835

(22) Filed: Sep. 26, 2016

(65) Prior Publication Data

US 2017/0012505 A1 Jan. 12, 2017

Related U.S. Application Data

(63) Continuation of application No. PCT/EP2015/056612, filed on Mar. 26, 2015.

(30) Foreign Application Priority Data

Mar. 27, 2014 (EP) ..................... 14161942

(51) Int. Cl.
*H02K 9/28* (2006.01)
*H01R 39/08* (2006.01)
*H01R 39/46* (2006.01)
*H02K 13/00* (2006.01)

(52) U.S. Cl.
CPC .............. *H02K 9/28* (2013.01); *H01R 39/08* (2013.01); *H01R 39/46* (2013.01); *H02K 13/003* (2013.01)

(58) Field of Classification Search
CPC ........ H02K 9/28; H02K 13/003; H01R 13/66; H01R 39/08; H01R 39/46; H01R 39/58

USPC ........ 310/52, 54, 58, 64, 127–151; 219/469, 219/471, 494, 497, 501
See application file for complete search history.

(56) References Cited

U.S. PATENT DOCUMENTS

| 3,206,630 A | 9/1965 | Berger et al. |
| 4,410,821 A | 10/1983 | Kurt |
| 4,849,586 A | 7/1989 | Ida et al. |

(Continued)

FOREIGN PATENT DOCUMENTS

| CN | 103166078 A | 6/2013 |
| EP | 0 662 736 | 7/1995 |

(Continued)

OTHER PUBLICATIONS

Machine translation of JP 2014-192990 A, retrieved from EPO.*
The International Search Report dated Aug. 27, 2015 for International Patent Application No. PCT/EP2015/056612.

*Primary Examiner* — Quyen P Leung
*Assistant Examiner* — Minki Chang
(74) *Attorney, Agent, or Firm* — Yakov S. Sidorin; Quarles & Brady LLP

(57) ABSTRACT

A slipring assembly comprises a slipring module having at least one slipring track, which is in electrical contact with at least one slipring brush. The slipring module comprises an isolating body holding the at least one slipring track. Furthermore a cooling element is embedded into or attached to the slipring module to remove heat from the slipring module and to increase the temperature of the at least one slipring track. This allows decreasing the temperature of the slipring module to increase the maximum transferable power and lifetime.

18 Claims, 7 Drawing Sheets

(56) References Cited

U.S. PATENT DOCUMENTS

| | | | | |
|---|---|---|---|---|
| 5,917,248 | A | * | 6/1999 | Seguchi .................. B60K 6/26 290/31 |
| 2010/0060089 | A1 | * | 3/2010 | Lee .......................... H02K 9/22 310/52 |
| 2013/0147310 | A1 | | 6/2013 | Safari Zadeh |
| 2014/0038433 | A1 | * | 2/2014 | Rehder .................. H01R 39/08 439/18 |
| 2015/0311772 | A1 | * | 10/2015 | Tominaga .............. H02K 13/02 310/232 |
| 2017/0141657 | A1 | * | 5/2017 | Minami .................. H02K 19/22 |

FOREIGN PATENT DOCUMENTS

| | | |
|---|---|---|
| EP | 2696449 | 2/2014 |
| GB | 941729 | 11/1963 |
| GB | 2 461 533 | 1/2010 |
| JP | S49105106 | 10/1974 |
| JP | S5795154 | 6/1982 |
| JP | 2013079433 | 4/2012 |
| JP | 2014192990 A * | 10/2014 |
| WO | 96/14678 | 5/1996 |
| WO | 2012/028992 | 3/2012 |

\* cited by examiner

SLIPRING WITH ACTIVE COOLING

CROSS-REFERENCE TO RELATED APPLICATIONS

This application is a continuation of pending International Application No. PCT/EP2015/056612 filed Mar. 26, 2015 which designates the United States and claims priority from the European Application No. 14161942.9 filed on Mar. 27, 2014. The disclosure of each of the above-identified patent documents is incorporated herein by reference.

BACKGROUND

1. Field of the Invention

The invention relates to an electrical power transfer device such as a slipring or rotary joint. Sliprings are used to transfer electrical power between rotating parts of machines such as wind power plants, CT scanners or electrical generators. There a brush, mainly comprising electrically conductive material such as a metal or carbon is sliding on a rotating cylindrical track of conductive material, called the sliding track. Common materials for such tracks are steel, bronze or brass, sometimes being gold or silver-plated. At least one or a plurality of sliding tracks is held by an insulating material forming a module. Modules may have a shape of a disc or of a cylinder.

2. Description of Relevant Art

In the European patent application EP 0 662 736 A1 a slipring is disclosed which comprises of a plurality of wires of conductive material which are sliding in a V-groove of a sliding track of further conductive material. Due to the galvanic contact between the wires and the sliding track electric current can be transferred between the two parts rotating against each other.

The international patent application publication WO 2012/028992 discloses problems arising due to high heat developing under rotation of a slipring while transferring high currents. It further discloses a solution to handle high temperatures within the slipring by selecting specific materials.

The U.S. Pat. No. 4,849,586 discloses a slip ring based on a planar conductive plate, which has a heater located near such a planar conductive plate to prevent condensed water from freezing.

GB 2 461 533 A discloses a method for estimating and controlling of wear in wind turbine slip ring brushes by measuring the slip ring temperature and the wind turbine nacelle humidity.

A heated slipring module is disclosed in EP 2 696 449 A1 which prevents the sliding track from icing and moisture on the surface, which would decrease isolation. Various transmission systems.

SUMMARY

The embodiments of the present invention provide a slipring with enhanced current transfer capabilities in an increased temperature range, especially if the available space is limited.

In contradistinction with related art, in a first embodiment of the invention a cooling element is integrated into a slipring module. Preferably, this cooling element is embedded into the slipring module or attached to the module. Most preferably, it is attached to the surface of the slipring module, preferably attached to the side opposite to the slipring tracks, most preferably attached to the inner surface of the slipring module. Due to the cooling, the temperature of the module and/or the sliding tracks may be decreased, which leads to a higher current capability of the module and the whole slipring. Tests have shown that system wear increases at high temperatures (especially if operated above 100° C.). Any liquid lubrication (if used) can be subjected to significant vaporization (since vapor pressure increases). In addition, if temperature climbs too high, design components under stress can fail or creep and/or unacceptable shape changes can occur due to different thermal expansion.

The cooling element preferably is a Peltier element or a heat pipe. It may also be a heat sink or a pipe containing a liquid or cooling agent. The cooling element transfers heat from the slipring module to the environment. The cooling element may further be connected to a heat sink for better heat dissipation to the environment. Such a heat sink may be a large metal part, preferably with fins.

In one embodiment, the cooling element comprises a liquid cooling system. It may be fed by a cooling liquid, which may be water or any cooling agent. Sometimes, in complex slipring systems, sliprings are combined with at least one liquid media rotary joint for transporting a liquid between the rotating parts. Often, the transported liquid used therein is water or any other cooling agent. This liquid may also be used in the cooling element for cooling the module. Therefore, the rotating part of the liquid media rotary joint may be connected to the cooling element. There may also be a heat exchanger, which may also be a heat pipe and which couples a local cooling liquid feeding the cooling element to the transported liquid.

The flow of the cooling liquid through the pipe can be either active (by a pump) or passive by convection of the liquid or liquid vaporizing on the hot side of the pipe and condensing on the cold side of the pipe (heat pipe).

Preferably, cooling of the slipring module is controlled by a temperature controller or a cooling controller. Most preferably, a temperature controller switches cooling on if the temperature exceeds a threshold value and/or it controls the cooling element such that there is a constant temperature value at the slipring module and/or track. The controller may control a liquid pump or the current through a Peltier element. A major advantage of cooling the slipring module is the comparatively low power consumption as cooling is only applied to the portion of the slipring, where it is required. A cooling controller may feed a cooling liquid into cooling pipe to cool the module. The controller may comprise a Peltier element, a heat pump, a heat sink or any other means for cooling the liquid. It is further preferred, if the controller comprises a pump for generation a cooling liquid flow through the pipe.

In a further embodiment, there is a temperature sensor embedded into a slipring module.

A further aspect is a thermal management system, which comprises a cooling element and a heating element. An exemplary heating element is disclosed in EP 2 696 449 A1 which is included herein by reference in its entirety. Such a thermal management system may heat the slipring module, if its temperature is under a lower limit and it may cool the slipring module, if its temperature is above an upper limit.

Another embodiment relates to a slipring assembly, including a slipring module with an isolating body with at least one slipring track and at least one brush, which is in electrical contact with at least one slipring track.

Tests on a large number of sliprings have shown that the current capacity of slipring tracks can be increased by lowering temperatures. This also reduces contact noise and wear of the sliding brushes. Specifically carbon brushes have shown to be sensitive to an extremely dry environment. Due to the cooling, the temperature can be increased and the relative humidity can be increased, which significantly increases lifetime. Furthermore, high temperatures lead to a degradation of electrical isolation of the brushes and the module, which may cause sparking and damaging of the parts.

Furthermore, the thermal capacity of the brush block is significantly higher than the thermal capacity of the brushes. Therefore cooling the brush block will often result in cooling the brushes.

An inventive method comprises the steps of cooling a slipring module by transporting heat from the slipring module by a cooling element.

BRIEF DESCRIPTION OF THE DRAWINGS

In the following, the invention will be described by way of example, without limitation of the general inventive concept, on examples of embodiment and with reference to the drawings.

Figure 1:
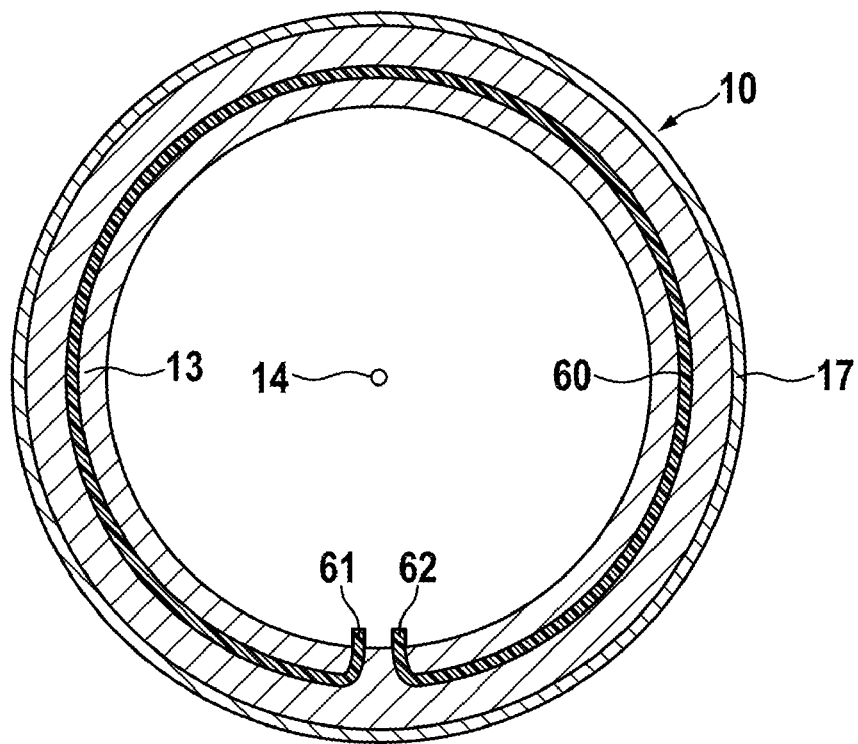
FIG. 1 shows a preferred embodiment.

While the invention can be modified without changing its scope and take alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In FIG. 1, a sectional view of a preferred embodiment is shown. A slipring module 10 has at least one slipring track 17, which is held by insulating body 13, which may rotate around rotation axis 14. Preferably, the slipring track 17 is embedded or molded into insulating body 13. Furthermore, a cooling element 60 is integrated into the body 13. Preferably, the cooling element is a pipe through which a coolant flows. It may have an inlet 61 and an outlet 62. Preferably, the cooling element 60 is isolated from the slip ring track 17. Most preferably, the pipe is of a plastic material. It is further preferred, if the cooling element 60 is arranged in close proximity to the slipring track 17 and most preferably in a good thermal contact to slipring track 17. In a further preferred embodiment, the insulating body 13 comprises a thermally conductive material to improve heat transfer from cooling element 60 to slipring track 17. The cooling element 60 may be a single pipe or a plurality of pipes.

Figure 2:
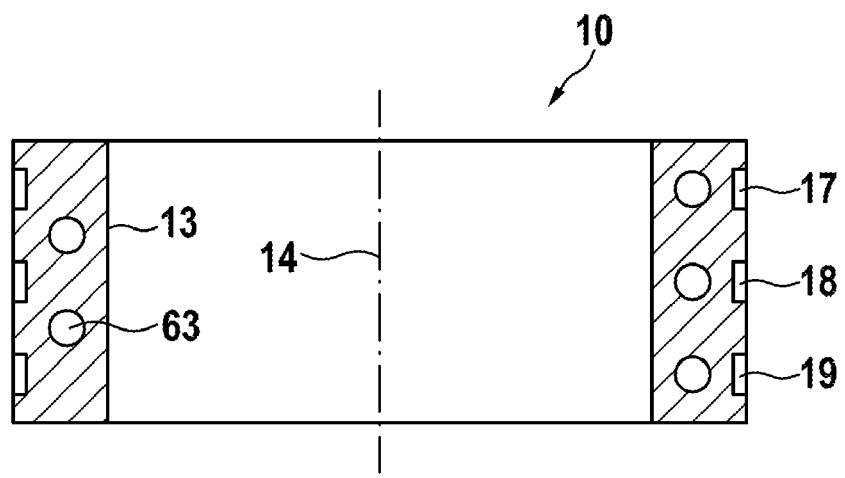
FIG. 2 shows another view of a preferred embodiment.

In FIG. 2, another view of a preferred embodiment is shown. Here the slipring module is cut parallel to the rotation axis 14. Besides first track 17 there is a second track 18 and a third track 19. In this embodiment, the cooling element 63 is a pipe forming a spiral, which is embedded into the isolating body 13 below the three slipring tracks. Instead of the spiral shaped pipe, also a plurality of pipes may be used. Furthermore a tube or any other kind of cavity such as e.g. a drilled or molded hole may be used.

Figure 3:
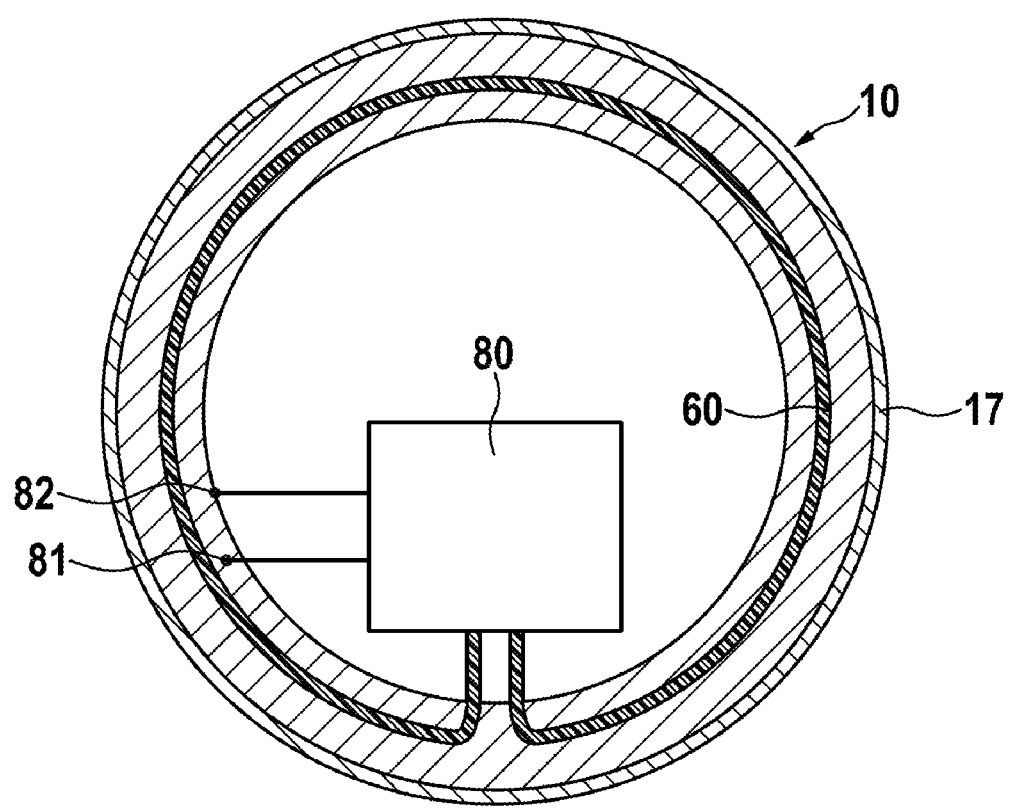
FIG. 3 shows a controller connected to a slipring module.

In FIG. 3, a cooling controller 80 is shown. This controller is connected to cooling element 60 to control the temperature of the cooling element and/or slipring track 17. The controller feeds a cooling liquid into cooling pipe 60 to cool the module. The controller may comprise a Peltier element, a heat pump, a heat sink or any other means for cooling the liquid. It is further preferred, if the controller comprises a pump for generation a cooling liquid flow through the pipe. This cooling liquid flow and/or temperature may be controlled by using at least one sensor or by an external control signal. There may be a temperature sensor 81 to provide information about the temperature of the slipring module and/or the slipring tracks to the controller 80. Preferably, the temperature sensor is embedded into the insulating body 13 of the slipring module. It may also be thermally connected to at least one slipring track to provide a precise temperature measurement. Furthermore, there may be a plurality of temperature sensors to provide temperature information of different locations. There may also be a humidity sensor 82 providing humidity information to the controller 80. Preferably, this humidity sensor is at the surface of slipring module 10. Either the humidity sensor may be a standard capacitive humidity sensor or it may be a conductivity sensor measuring the conductivity on the surface of slipring module 10. For measuring conductivity, there may be some electrodes within this surface of slipring module 10. In an alternative embodiment the conductivity and/or isolation between slipring tracks, most preferably between neighboring slipring tracks, may be measured. Based on the information from the humidity sensor, cooling may be reduced or suspended to prevent condensation at the module surface, which would degrade isolation. The cooling controller may also be enabled to deliver heat to the slipring module if the temperature of the slipring module falls below a lower temperature limit.

Figure 4:
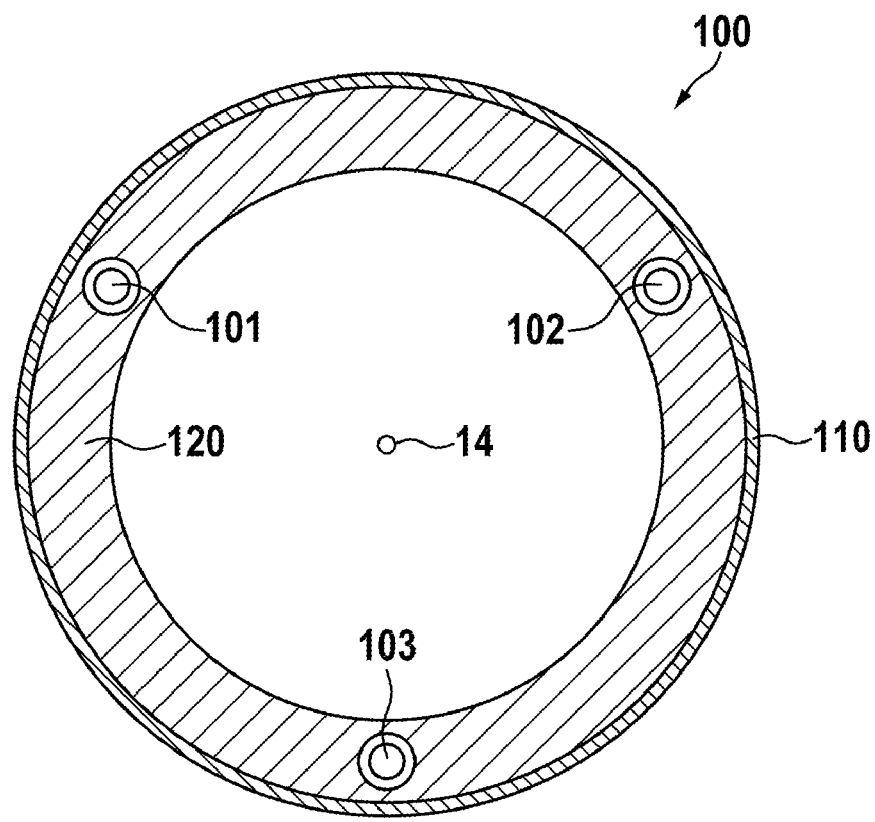
FIG. 4 shows a further embodiment.

FIG. 4 shows a further embodiment in a top view. A first slipring module 100 comprises at least a first sliding track 110. The sliding tracks are held by an isolating body 120. At least one cooling element 101, 102, 103, is located within a plurality of holes in the isolating body 120. Preferably, the cooling elements are spaced equally. Preferably, there are one, two, three or four cooling elements rods. Such a cooling element may comprise a part of a heat pipe, preferably the "hot" end of a heat pipe.

Figure 5:
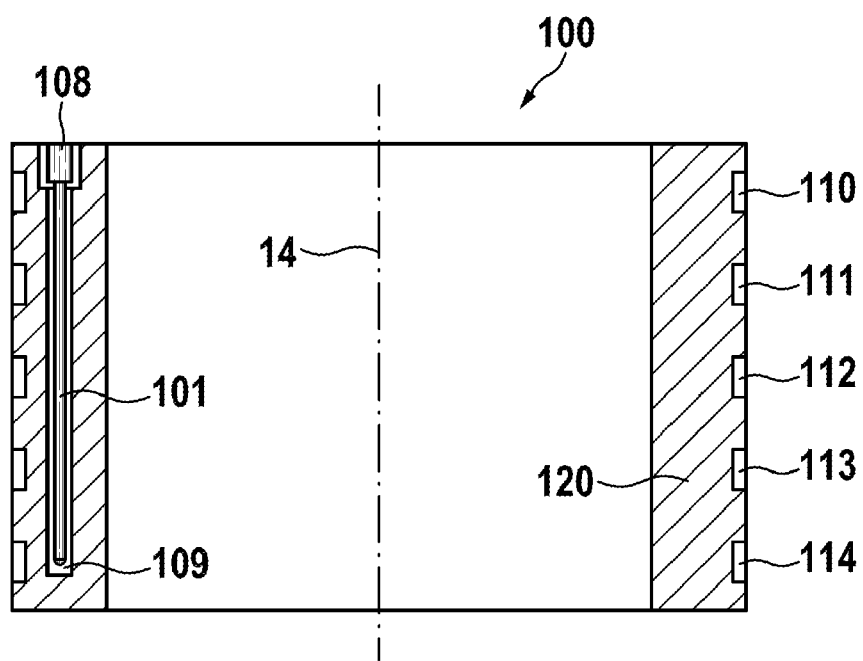
FIG. 5 shows a further embodiment in a sectional view.

FIG. 5 shows the embodiment of the previous figure in a sectional view. A blind hole 109 may be provided within the isolating body 120. It may hold a cooling element 101 for cooling slipring tracks 110, 111, 112, 113 and 114. Preferably, the cooling element is part of a heat pipe. The other end of the heat pipe may be thermally connected to a heat sink outside of the module. The cooling element 101 may have a pipe connector 108 for easy assembly and disassembly.

Figure 6:
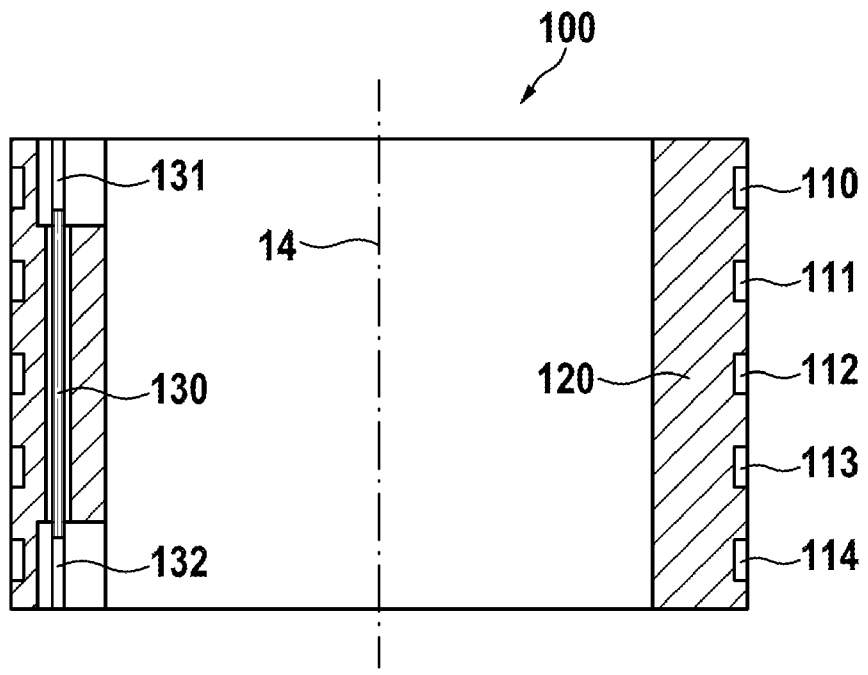
FIG. 6 shows another embodiment in a sectional view.

FIG. 6 shows another embodiment in a sectional view. There may be at least one through hole 130 within the isolating body 120. Within the through hole 130, there may be a cooling element, which preferably is connected by connecting pipes 131, 132.

Figure 7:
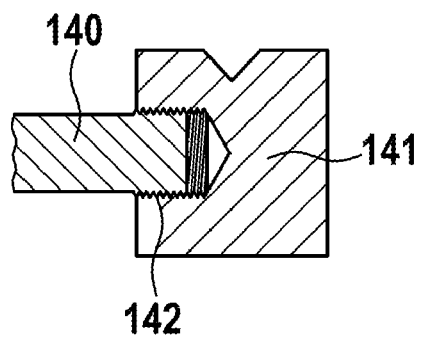
FIG. 7 shows a direct track cooling.

FIG. 7 shows a direct track cooling. Here a cooling element, preferably part of a heat pipe may be directly connected to a slipring track 141. Preferably, it is connected by a thread 142. This allows for a solid mechanical and heat conducting connection.

Figure 8:
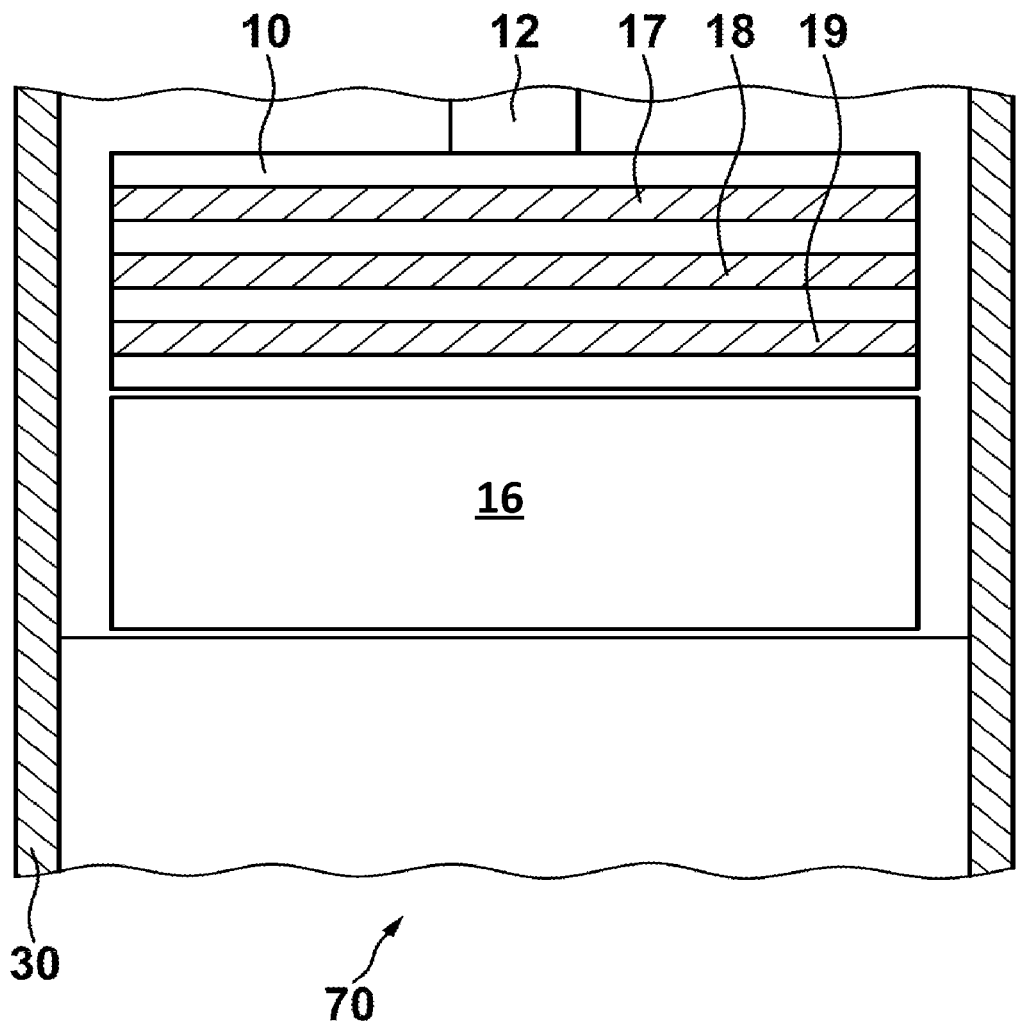
FIG. 8 shows a side view of a general slipring assembly.

In FIG. 8, a side view of a general slipring assembly is shown. Exemplarily there are a slipring module 10 and a liquid media rotary joint 16 mounted to a shaft 12. The rotating part of the liquid media rotary joint may be connected to a cooling element to deliver cooling liquid to the cooling element.

Figure 9:
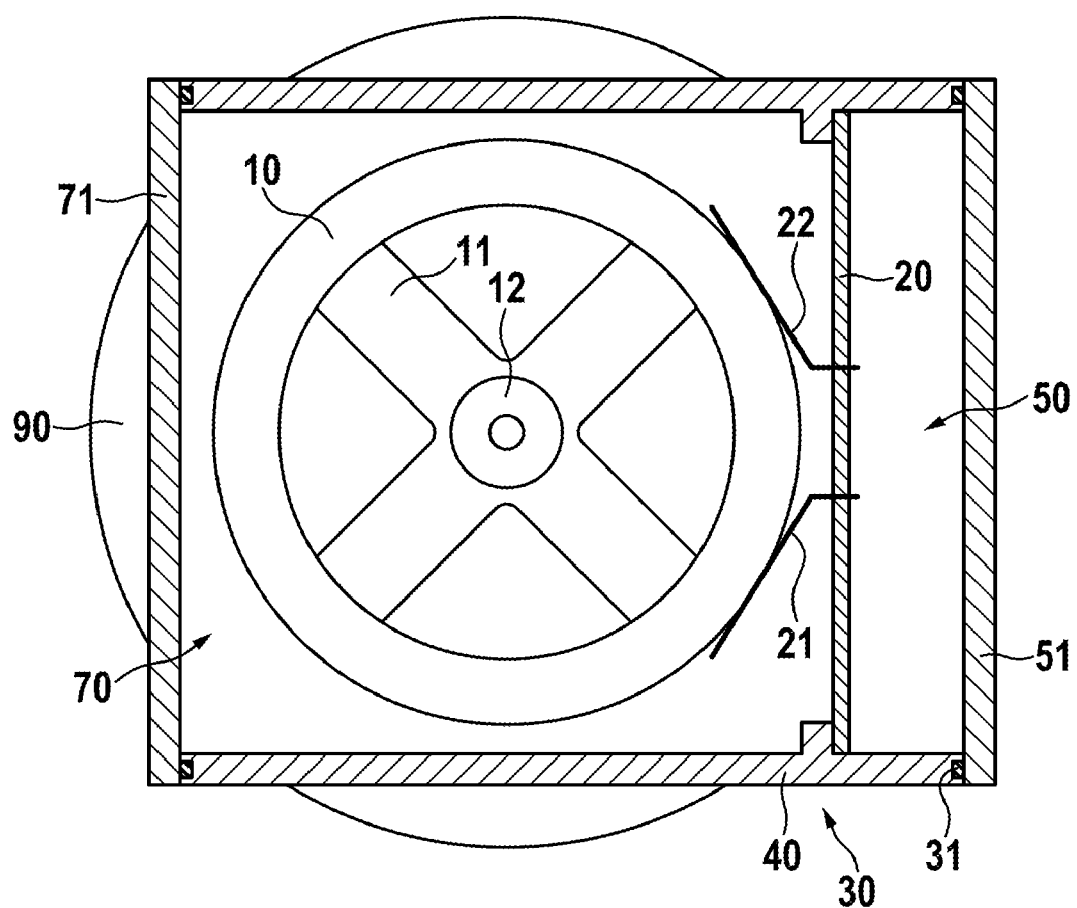
FIG. 9 shows a top view of a general slipring assembly.

In FIG. 9, a top view of the general slipring assembly is shown. A slipring module 10 is held by a module support 11 and mounted to a shaft 12. There is a plurality of contact brushes such as first contact brush 21 and second contact brush 22, which are held and electrically contacted by brush holder 20. The preferred contact brushes shown herein are wire brushes, formed by metal wires. Instead, carbon brushes may be used. The slipring assembly is enclosed by a slipring housing 30 having a plurality of sidewalls 40. There may be a connecting space 50 for electrically connecting the slipring brushes, which may have a first cover 51. Furthermore, the inner space 70 of the housing has a second cover 71.

Figure 10:
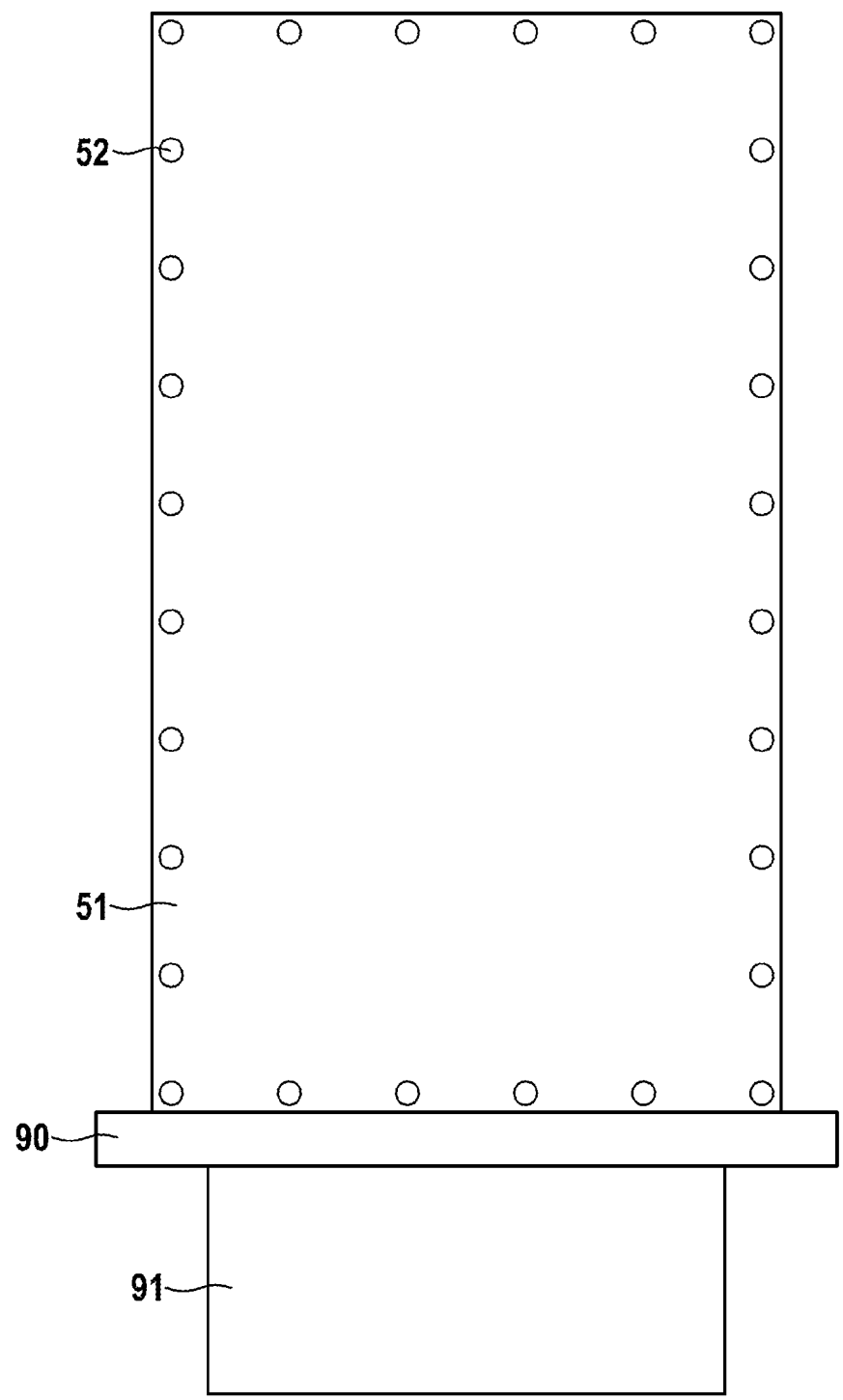
FIG. 10 shows a slipring housing.

In FIG. 10, a slipring housing is shown. The first cover 51 may be locked by a plurality of screws 52. There may further be a housing of bearing 90 to enclose a bearing, which allows rotation between the modules and the brushes and a module connection case 91 for electrically connecting and contacting the module. This case may also contain a controller 80.

It will be appreciated to those skilled in the art having the benefit of this disclosure that this invention is believed to provide a slipring or a rotary joint with integrated cooling. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 slipring module
11 module support
12 shaft
13 insulating body
14 rotation axis
16 liquid media rotary joint
17 first track
18 second track
19 third track
20 brush holder
21 first brush
22 second brush
30 slipring housing
31 ceiling
40 sidewall
50 connecting space
51 first cover
52 screws
60 cooling element
61 cooling element inlet
62 cooling element outlet
63 cooling pipe
70 inner space of housing
71 second cover
80 controller

The invention claimed is:

1. A slipring module comprising an insulating body holding at least one slipring track, the insulating body dimensioned as a cylinder having an outer diameter surface, an inner diameter surface, and thickness between the inner and outer diameter surfaces, the slipring module comprising:
at least one cooling element configured to remove heat and decrease temperature of the at least one slipring track,
the at least one cooling element being embedded into the insulating body between the inner and outer diameter surfaces and being electrically isolated from the at least one slipring track.

2. A slipring module according to claim 1, wherein the at least one cooling element comprises a pipe and a cooling liquid flowing through the pipe.

3. A slipring module according to claim 2, wherein the cooling liquid is supplied by a liquid media rotary joint.

4. A slipring module according to claim 1, wherein the at least one cooling element comprises a Peltier element.

5. A slipring module according to claim 4, further comprising a cooling controller configured to control current through the Peltier element, the cooling controller configured to carry out at least one of (a) controlling temperature, of at least one of the slipring module and the at least one slipring track, to a constant value, and (b) heating the at least one of the slipring module and the at least one slipring track if the temperature thereof is below a lower temperature limit.

6. A slipring module according to claim 5, further comprising a temperature sensor configured to measure said temperature and forward a value of said temperature to the cooling controller.

7. A slipring module according to claim 6, wherein the temperature sensor is embedded into the insulating body.

8. A slipring module according to claim 1, further comprising a heat sink, wherein the at least one cooling element is coupled to the heat sink.

9. A slipring module according to claim 1, wherein the at least one cooling element comprises a heat pipe.

10. A slipring module according to claim 1, wherein the at least one cooling element is in close thermal contact with the at least one slipring track.

11. A slipring module according to claim 1, further comprising a cooling controller configured to deliver a cooling agent through the at least one cooling element, the cooling controller configured to carry out at least one of (a) controlling temperature of at least one of the slipring module and the at least one slipring track to a constant value, and (b) heating the at least one of the slipring module and the at least one slipring track if the temperature thereof is below a lower temperature limit.

12. A slipring module according to claim 11, further comprising a temperature sensor configured to measure said temperature and forward a value of said temperature to the cooling controller.

13. A slipring module according to claim 12, wherein the temperature sensor is embedded into the insulating body.

14. A slipring module according to claim 1, wherein the at least one cooling element comprises a pipe and a cooling liquid contained in the pipe.

15. A slipring assembly comprising at least one slipring brush and at least one slipring module, the slipring module further comprising: an insulating body having an outer diameter surface, an inner diameter surface, and thickness defined between the inner and outer diameter surfaces, the insulating body holding at least one slipring track and at least one cooling element configured to remove heat and decrease temperature of the at least one slipring track, the at least one cooling element being embedded into the insulating body between the inner and outer diameter surfaces and being electrically isolated from the at least one slipring track.

16. A slipring module according to claim 15, wherein the at least one cooling element comprises a pipe and a cooling fluid contained in the pipe.

17. A slipring assembly according to claim 16, further comprising a housing enclosing the at least one slipring module and the at least one slipring brush.

18. A method for cooling of at least one of (i) at least one slipring track and (ii) a slipring module that includes said at least one slipring track by letting a cooling liquid flow through a cooling element of the slipring module to remove heat and decrease temperature of the at least one said at least one slipring track and said slipring module, wherein said cooling element is embedded in a thickness of an insulating body, of at least one slipring, defined between inner and outer surfaces of the insulated body and is radially shifted from an axis.

* * * * *